United States Patent [19]

Shinoda

[11] 4,289,103

[45] Sep. 15, 1981

[54] ALTITUDE COMPENSATING DEVICE OF AN INTERNAL COMBUSTION ENGINE

[75] Inventor: Kazuo Shinoda, Toyota, Japan

[73] Assignee: Toyota Jidosha Kogyo Kabushiki Kaisha, Aichi, Japan

[21] Appl. No.: 210,304

[22] Filed: Nov. 25, 1980

[30] Foreign Application Priority Data

Nov. 30, 1979 [JP] Japan .................... 54-154171

[51] Int. Cl.³ .................... F02B 33/00; F02M 7/00
[52] U.S. Cl. .................... 123/440; 60/285; 60/276
[58] Field of Search .......... 123/440, 487; 60/285, 60/276

[56] References Cited

U.S. PATENT DOCUMENTS

| | | | |
|---|---|---|---|
| 4,224,911 | 9/1980 | Mitsuda | 123/440 |
| 4,231,334 | 11/1980 | Peter | 123/440 |
| 4,248,196 | 2/1981 | Toelle | 123/440 |

Primary Examiner—Ronald B. Cox
Attorney, Agent, or Firm—Armstrong, Nikaido, Marmelstein & Kubovcik

[57] ABSTRACT

An internal combustion engine comprising a secondary air feed control device for feeding secondary air into the exhaust passage from the air pump. The amount of the secondary air fed into the exhaust passage is controlled by the output signal of an oxygen concentration detector arranged in the exhaust passage. An air-fuel ratio control device is arranged in the main fuel passage of the carburetor for controlling the amount of air bled into the main fuel passage in response to the output signal of the oxygen concentration detector. The amount of the air bled into the main fuel passage is increased as the altitude becomes higher so as to reduce the difference between the stoichiometric air-fuel ratio and an air-fuel ratio of the mixture formed by the carburetor.

10 Claims, 12 Drawing Figures

ALTITUDE COMPENSATING DEVICE OF AN INTERNAL COMBUSTION ENGINE

DESCRIPTION OF THE INVENTION

The present invention relates to an altitude compensating device for use in an internal combustion engine.

As a method of simultaneously reducing an amount of harmful HC, CO and $NO_x$ components in the exhaust gas, there has been known a method of using a catalytic converter containing a three way catalyzer therein. If the intake passage and the exhaust passage located upstream of the catalytic converter are defined as a gas passage, the exhaust gas purifying efficiency of such a three way catalyzer becomes highest when a ratio of an amount of air fed into the gas passage to an amount of fuel fed into the gas passage (hereinafter referred to as an overall air-fuel ratio) becomes equal to the stoichiometric air-fuel ratio. Consequently, in the case wherein the three way catalytic converter is used, it is necessary to precisely equalize the overall air-fuel ratio with the stoichiometric air-fuel ratio. As a device capable of precisely equalizing the overall air-fuel ratio with the stoichiometric air-fuel ratio, an engine equipped with a secondary air feed control device has been known. In this engine, the carburetor is so constructed that it always forms a rich air-fuel mixture. In addition, in this engine, an oxygen concentration detector is arranged in the exhaust passage located upstream of the three way catalytic converter, so that the amount of secondary air fed into the exhaust passage upstream of the catalytic converter from the air pump driven by the engine is controlled on the basis of the output signal of the oxygen concentration detector. In this engine, the feeding operation of the secondary air is controlled by the secondary air feed control device so as to equalize the overall air-fuel ratio with the stoichiometric air-fuel ratio in such a way that the amount of the secondary air fed into the exhaust passage is increased by increasing to some degree the opening of the secondary air feed control valve when the overall air-fuel ratio is less than the stoichiometric air-fuel ratio, while the amount of the secondary air fed into the exhaust passage is reduced by reducing to some degree the opening of the secondary air feed control valve when the overall air-fuel ratio is greater than the stoichiometric air-fuel ratio.

In the case wherein a vehicle equipped with such a secondary air feed control device is driven at a high altitude, since ambient air becomes diluted at high altitudes, the mixture formed by the carburetor becomes rich as compared with the case wherein the same vehicle is driven at a low altitude. Consequently, a large amount of the secondary air is fed into the exhaust passage for equalizing the overall air-fuel ratio with the stoichiometric air-fuel ratio. However, in the case wherein the same vehicle is driven at another higher altitude, the mixture formed by the carburetor becomes richer and, as a result, the secondary air feed control valve remains full open for further increasing the amount of secondary air fed into the exhaust passage. Nevertheless, even if the secondary air feed control valve remains full open, as mentioned above, it is impossible to feed secondary air into the exhaust passage in an amount which is sufficient to equalize the overall air-fuel ratio with the stoichiometric air-fuel ratio. As a result of this, the reduction components in the exhaust gas become excessive and, thus, a problem occurs in that it is impossible to fully purify the harmful HC, CO and $NO_x$ comonents in the exhaust gas.

It is possible to solve such a problem by increasing the volume of the air pump. However, the increase in the volume of the air pump brings about an increase in the manufacturing cost of an engine. Consequently, it is not preferable to solve the above-mentioned problem by increasing the volume of the air pump. In addition, if a large amount of the secondary air is fed into the exhaust gas by increasing the volume of the air pump and, thus, a large amount of unburned HC and CO is reacted with a large amount of the secondary air, the temperature of the three way catalyzer is extraordinarily increased due to the heat caused by the reactiion. As a result of this, problems occur in that the three way catalyzer deteriorates, and that causes the three way catalytic converter to become damaged.

An object of the present invention is to provide an internal combustion engine equipped with a secondary air feed control device which is capable of equalizing the overall air-fuel ratio with the stoichiometric air-fuel ratio overall air-fuel ratio with the stoichiometric air-fuel ratio by feeding a small amount of the secondary air into the exhaust passage when a vehicle is driven at a high altitude.

According to the present invention, there is provided an altitude compasating device of an internal combustion engine comprising an intake passage, a fuel feed apparatus arranged in said intake passage, an exhaust passage, and an air pump driven by said engine and connected to said exhaust passage via a secondary air feed passage, said device comprising: a detector arranged in said exhaust passage for detecting the overall air-fuel ratio to produces a detecting signal; a first comparator for comparing said detecting signal with a first reference voltage to produce an output signal, the potential of which is of a high level when the total air-fuel ratio is less than the stoichiometric air-fuel ratio, but is of a low level when the total air-fuel ratio is greater than the stoichiometric air-fuel ratio; a first integrator for integrating the output signal of said first comparator; an adder for adding an output signal of said first integrator to the output signal of said first comparator; first means for generating a first train of pulses, each having a width which is proportional to the level of an output signal of said adder; secondary air feed control means arranged in said secondary air feed passage and actuated in response to said first train of pulses for increasing the amount of the secondary air fed into said exhaust passage from said air pump in accordance with an increase in width of the pulse of said first train of pulses; a second integrator for integrating the output signal of said adder to produce an output signal having a level which corresponds to the mean value of the output signal of said adder and is increased in accordance with an increase in altitude, the time constant of said second integrator being greater than that of said first integrator; second means for generating a second train of pulses, each having a width which is proportional to the level of the output signal of said second integrator, and; air-fuel ratio control means arranged in said fuel feed apparatus and actuated in response to said second train of pulses for increasing the air-fuel ratio of a mixture formed by said fuel feed apparatus to reduce the difference between the air-fuel ratio of said mixture and the stoichiometric air-fuel ratio when the altitude is higher than a predetermined level.

The present invention may be more fully understood from the descriptions of the preferred embodiments of the invention set forth below, together with the accompanying drawings.

DESCRIPTION OF PREFERRED EMBODIMENTS

Figure 1:
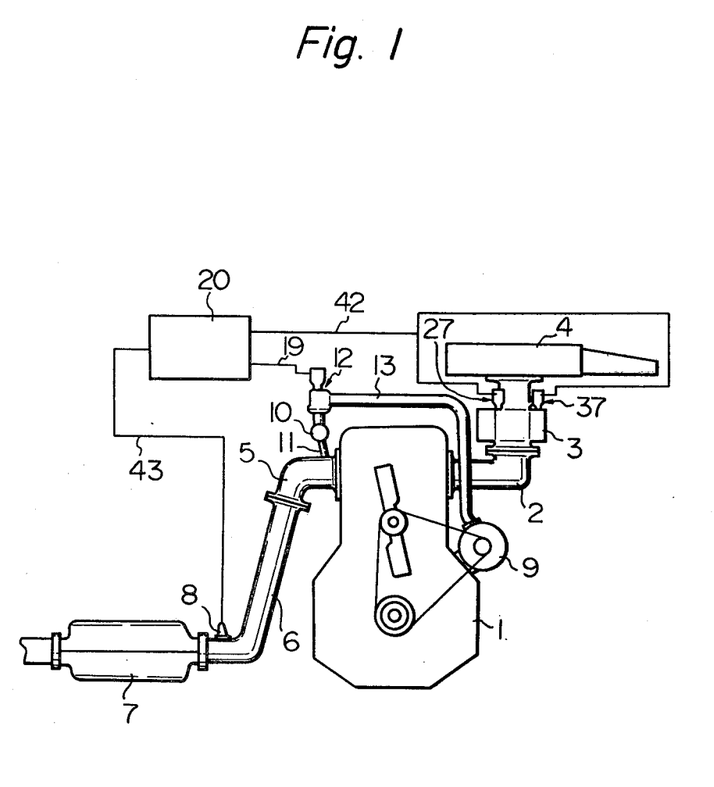
FIG. 1 is a general view of an internal combustion engine.
Figure 2:
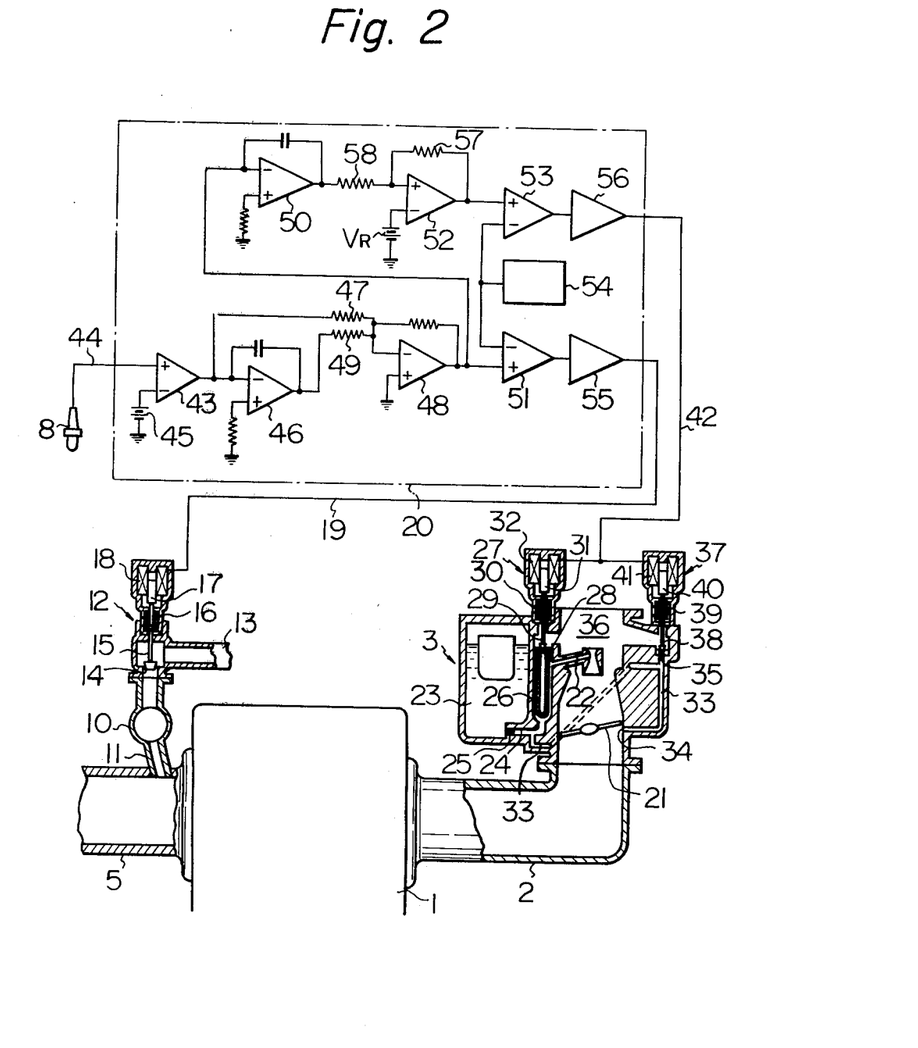
FIG. 2 is a cross-sectional side view of an embodiment of an altitude compensating device according to the present invention.
Figure 3A:
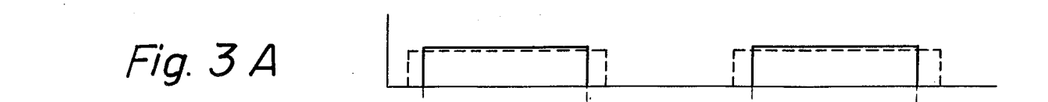
FIGS. 3A-3I is a timing diagram showing signals generated in the electronic circuit illustrated in FIG. 2.
Figure 3B:
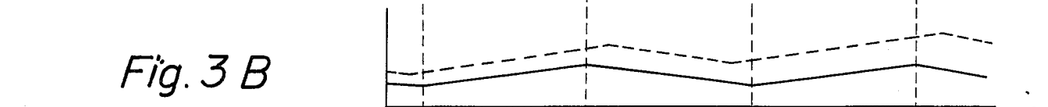
Figure 3C:
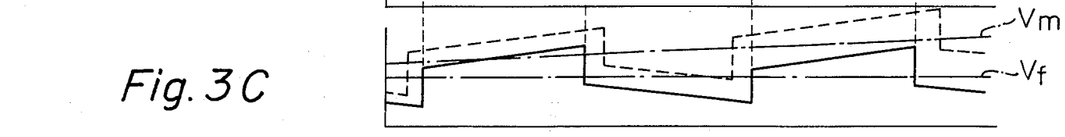
Figure 3D:
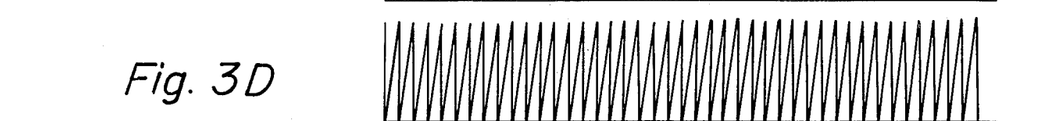
Figure 3E:
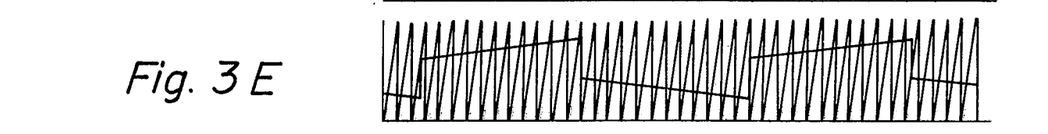
Figure 3F:
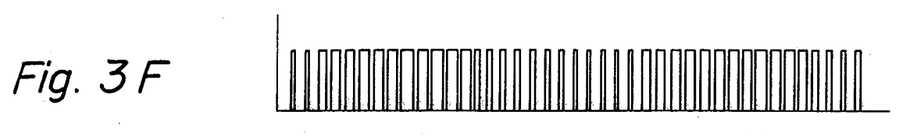
Figure 3G:
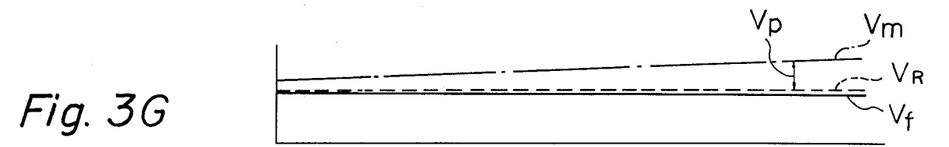
Figure 3H:
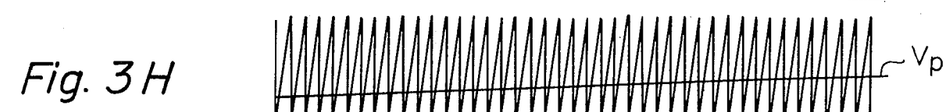
Figure 3I:
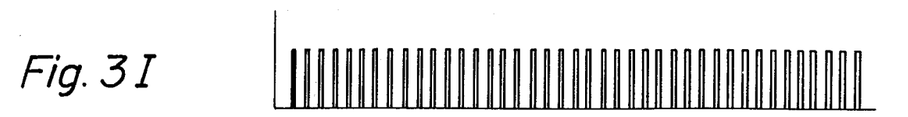

Referring to FIGS. 1 and 2, 1 designates an engine body, 2 an intake manifold, 3 a carburetor, 4 an air cleaner, 5 an exhaust manifold, 6 an exhaust pipe, 7 a three way catalytic converter, 8 an oxygen concentration detector arranged in the exhaust pipe 6, and 9 designates an air pumps driven by the engine. An air manifold 10 extending in the longitudinal direction of the engine body 1 is arranged above the exhaust manifold 5. The air manifold 10 is connected to the manifold branches of the exhaust manifold 5 via corresponding air manifold branches 11 on one side and to the delivery side of the air pump 9 via a secondary air feed control valve device 12 and a secondary air feed conduit 13 on the other side. The secondary air feed control valve device 12 comprises a secondary air feed control valve 15 for controlling the flow area of a valve port 14, a compression spring 16 for always biasing the secondary air feed control valve 15 towards the valve port 14, a movable plunger 17 connected to the secondary air feed control valve 15, and a solenoid 18 for attracting the movable plunger 17. This solenoid 18 is connected to an electronic control circuit 20 via a lead 19.

As illustrated in FIG. 2, the carburetor 3 comprises a throttle valve 21, a main nozzle 22, a float chamber 23, a main fuel passage 24 interconnecting the main nozzle 22 to the float chamber 23, and a main jet 25 arranged at the inlet of the main fuel passage 24. An air bleed pipe 26 is inserted into the main fuel passage 24, and a first air-fuel ratio control device 27 is arranged above the air bleed pipe 26. The first air-fuel ratio control device 27 comprises an air bleed control valve 29 for controlling the flow area of a valve port 28 formed on the top of the air bleed pipe 26, a compression spring 30 for always biasing the air bleed control valve 29 towards the valve port 28, a movable plunger 31 connected to the air bleed control valve 29, and a solenoid 32 for attracting the movable plunger 31. A slow fuel passage 33 is branched off from the main fuel passage 24 and connected to a slow fuel port 34. In addition, the slow fuel passage 33 is connected to an air horn 36 of the carburetor 3 via a valve port 35, and a second air-fuel ratio control device 37 is arranged above the valve port 35. The second air-fuel ratio control device 37 comprises an air bleed control valve 38 for controlling the flow area of the valve port 35, a compression spring 39 for always biasing the air bleed control valve 38 towards the valve port 35, a movable plunger 40 connected to the air bleed control valve 38, and a solenoid 41 for attracting the movable plunger 40. This solenoid 41 and the solenoid 32 of the first air-fuel ratio control device 27 are connected to the electronic control circuit 20 via a lead 42.

As illustrated in FIG. 2, the electronic control circuit 20 includes a comparator 43, and the output terminal of the oxygen concentration detector 8 is connected to the non-inverting input terminal of the comparator 43 via a lead 44. On the other hand, the inverting input terminal of the comparator 43 is grounded via a reference power source 45 of about 0.5 volt. The output terminal of the comparator 43 is connected to the input terminal of a first integrating circuit 46 having a relatively small time constant on one side and to the input terminal of an adder circuit 48 via a weighting resistor 47 on the other side. In addition, the output terminal of the first integrating circuit 46 is connected to the input terminal of the adder circuit 48 via a weighting resistor 49. The output terminal of the adder circuit 48 is connected, on one side, to the non-inverting input terminal of a comparator 51 and, on the other side, to the input terminal of a second integrating circuit 50 having a time constant which is considerably greater than that of the first integrating circuit 46. The output terminal of the second integrating circuit 50 is connected to the inverting input terminal of a differential amplifier 52 via a resistor 58, and the non-inverting input terminal of the differential amplifier 52 is grounded via a reference power source $V_R$, which is hereinafter described. The output terminal of the differential amplifier 52 is connected to the non-inverting input terminal of a comparator 53. As illustrated in FIG. 2, the electronic control circuit 20 includes a saw tooth shaped wave generating circuit 54 which oscillates at a constant frequency, for example, in a range of from 20 Hz to 40 Hz. The output terminal of the saw tooth shaped wave generating circuit 54 is connected to the inverting input terminals of the comparators 51 and 53. The output terminal of the comparator 51 is connected to the solenoid 18 of the secondary air feed control valve device 12 via an amplifier 55, and the output terminal of the comparator 53 is connected to the solenoids 32.41 of the air-fuel ratio control devices 27.37 via an amplifier 56.

As is known to those skilled in the art, the oxygen concentration detector 8 produces an output voltage of about 0.9 volt when the overall air-fuel ratio is smaller than the stoichiometric air-fuel ratio, that is, when the exhaust gas is the reducing atmosphere. On the other hand, the oxygen concentration detector 8 produces an output voltage of about 0.1 volt when the overall air-fuel ratio is greater than the stoichiometric air-fuel ratio, that is, when the exhaust gas is the oxidizing atmosphere. As mentioned previously, the reference voltage of the reference power source 45 connected to the inverting input terminal of the comparator 43 is about 0.5 volt. Consequently, when the output voltage of the oxygen concentration detector 8 becomes greater than the above-mentioned reference voltage, that is, when the overall air-fuel ratio becomes smaller than the stoichiometric air-fuel ratio, the output voltage of the comparator 43 becomes a high level. In the case wherein a vehicle is driven at a low altitude, the comparator 43 produces pulses having a high level and a low level which are alternately repeated at almost the same time intervals as illustrated by the solid line in FIG. 3 (a). The frequency of the output pulses of the comparator 43 is determined by the responsiveness of the secondary air feed control device and, in the embodiment illustrated in FIGS. 1 and 2, this frequency is equal to 1 Hz through 2 Hz. Then, the output pulses of the comparator 43 are integrated in the first integrating circuit 46 having a fixed time constant and, as a result, the first integrating circuit 46 produces an output voltage illustrated by the solid line in FIG. 3 (b). The output voltage of the first integrating circuit 46 and the output pulses of the comparator 43 are added in the adder circuit 48 and, as a result, the adder circuit 48 produces an output voltage illustrated by the solid line in FIG. 3 (c). The mean value of the output voltage of the adder circuit 48 is indicated by $V_f$ in FIG. 3 (c), and this mean value $V_f$ is maintained constant in the case wherein the comparator 43 produces output pulses having a high level and a low level which are alternately repeated at almost the same time internal as illustrated by the solid line in FIG. 3 (a). The saw tooth shaped wave generating circuit 54 produces an output voltage having a constant frequency rangeing from 20 Hz to 40 Hz, as illustrated in FIG. 3 (d). The output voltage of the saw tooth shaped wave generating circuit 54 and the output voltage of the adder circuit 48 are compared with each other in the comparator 51, and the output voltage of the comparator 51 becomes a high level when the output voltage of the adder circuit 48 becomes larger than the output voltage of the saw tooth shaped wave generating circuit 54. Consequently, the comparator 51 produces output pulses each having a width which is proportional to the output voltage of the adder circuit 48. As will be understood from FIGS. 3 (a) and (f), when the output voltage of the comparator 43 becomes a high level, that is, when the overall air-fuel ratio becomes smaller than the stoichiometric air-fuel ratio, the width of the output pulse of the comparator 51 is increased. The output pulse of the comparator 51 is fed into the solenoid 18 of the secondary air feed control valve device 12 via the amplifier 55. As the width of the pulse fed into the solenoid 18 is increased, the attracting force of the solenoid 18 with respect to the movable plunger 17 is increased and, accordingly, the secondary air feed control valve 15 moves away from the valve port 14. As a result of this, the flow area of the valve port 14 is increased. Consequently, when the overall air-fuel ratio becomes smaller than the stoichiometric air-fuel ratio, since the width of the pulse fed into the solenoid 18 is increased, as mentioned above, the flow area of the valve port 14 is increased, and, as a result, a large amount of the secondary air is fed into the exhaust manifold 5 from the air pump 9 (FIG. 1) via the secondary air feed conduit 13, the air manifold 10 and the air manifold braches 11. When the overall air-fuel ratio becomes greater than the stoichiometric air-fuel ratio by feeding a large amount of the secondary air into the exhaust manifold 5, as mentioned above, the output voltage of the comparator 43 becomes a low level. As a result of this, since the width of the pulse fed into the solenoid 18 is reduced, the flow area of the valve port 14 is reduced and, accordingly, the amount of the secondary air fed into the exhaust manifold 5 is reduced. When the overall air-fuel ratio becomes smaller than the stoichiometric air-fuel ratio, due to the reduction in an amount of the secondary air fed into the exhaust manifold 5, as mentioned above, the output voltage of the comparator 43 becomes a high level and, as a result, the amount of the secondary air fed into the exhaust manifold 5 is increased again. The amount of the increase and the decrease of the secondary air fed into the exhaust manifold 5 are repeated, as mentioned above and, as a result, the overall air-fuel ratio is equalized with the stoichiometric air-fuel ratio.

On the other hand, the output voltage of the adder circuit 48, which is indiaated by the solid line in FIG. 3 (c), becomes smooth in the second integrating circuit 50 having a large time constant and, as a result, the second integrating circuit 50 produces the output voltage which corresponds to the mean value $V_f$(FIG. 3 (c) and (g) of the output voltage of the adder circuit 48. The output voltage of the second integrating circuit 50 is fed into the non-inverting input terminal of the differential amplifier 52 via the resistor 58 having a resistance value which is almost the same as that of a resistor 57. The reference voltage of the reference power source $V_R$ connected to the inverting input terminal of the differential amplifier 52 is set at a fixed voltage level which is slightly larger than the mean value $V_f$ of the output voltage of the adder circuit 48, as illustrated in FIG. 3 (g). Consequently, when the output voltage of the second integrating circuit 50, which corresponds to the above-mentioned mean value $V_f$, is fed into the non-inverting input terminal of the differential amplifier 52, the output voltage of the differential amplifier 52 becomes a low level. The output voltage of the differential amplifier 52 and the output voltage of the saw tooth shaped wave generating circuit 54 are compared with each other in the comparator 53. This comparator 53 produces an output voltage of a high level when the output voltage of the differential amplifier 52 becomes larger than that of the saw tooth shaped wave generating circuit 54. However, since the output voltage of the differential amplifier 52 is a low level, the output voltage of the comparator 53 is maintained at a low level and, as a result, the solenoids 32, 41 of the air-fuel ratio control devices 27, 37 remain de-energized. Consequently, at this time, since the air bleed control valves 29 and 38 close the valve ports 28 and 35, respectively, the operation of bleeding air into the main fuel passage 24 and the slow fuel passage 33 remains stopped. Although, it is not depicted in FIG. 2, the main fuel passage 24 and the slow fuel passage 33 may be connected to the air horn 36 via the corresponding orifices, each having a fixed cross-section, for constantly bleeding air into the main fuel passage 24 and the slow fuel passage 33 via such orifices.

On the other hand, in the case wherein a vehicle is driven at a high altitude, since ambient air becomes diluted, the mixture formed by the carburetor 3 becomes rich, as compared with the case wherein the same vehicle is driven at a low altitude. Consequently, in order to equalize the overall air-fuel ratio with the stoichiometric air-fuel ratio, a large amount of the secondary air is necessary, as compared with the case wherein the vehicle is driven at a low altitude. Consequently, when the vehicle is driven at a high altitude, the time period during which the comparator 43 produces the output voltage of a high level, becomes longer than the time period during which the comparator 43 produces the output voltage of a low level, as illustrated by the broken line in FIG. 3 (a). As a result of this, the output voltage of the first integrating circuit 46 becomes greater as compared with the case wherein the vehicle is driven at a low altitude, as illustrated by the broken line in FIG. 3 (b) and, accordingly, the output voltage of the adder circuit 48 becomes large, as illustrated by the broken line in FIG. 3 (c). Therefore, the width of the pulse fed into the solenoid 18 is increased, as compared with the case wherein the vehicle is driven at a low altitude and, thus, a large amount of the secondary air is fed into the exhaust manifold 5. On the other hand, as the output voltage of the adder circuit 48 becomes large, as mentioned above, the mean value of the output voltage of the adder circuit 48 becomes large, as indicated by $V_m$ in FIG. 3 (c). Consequently, the second integrating circuit 50 produces an output voltage corresponding to the above-mentioned mean value $V_m$, which is larger than the reference voltage $V_R$ and, thus, the differential amplifier 52 produces an output voltage corresponding to the voltage difference $V_p$, which is the difference between the reference voltage $V_R$ and the mean value $V_m$, as illustrated in FIG. 3 (g). The voltage difference $V_p$ and the output voltage of the saw tooth shaped wave generating circuit 54 are compared with each other in the comparator 53, as illustrated in FIG. 3 (h), and, as a result, the comparator 53 produces output pulses each having a width which is proportional to the difference voltage $V_p$. The output pulses of the comparator 53 are fed into the solenoids 32, 41 of the air-fuel ratio control deveices 27, 37 via the amplifier 56 and, thus, the air bleed control vales 29 and 38 open the valve ports 28 and 35, respectively. At this time, the flow area of each of the valve ports 28, 35 is increased as the width of the pulse fed into the solenoids 32, 41 is increased.

When the air bleed control valves 29 and 38 open the valve ports 28 and 35, respectively, air is fed, on one side, into the main fuel passage 24 via the valve port 28 and the air bleed pipe 26 and, on the other side, into the slow fuel passage 33 via the valve port 35. As a result of this, the fuel flowing out from the main nozzle 22 and the fuel flowing out from the slow fuel port 34 are diluted by the air and, thus, an air-fuel ratio of the mixture formed by the carburetor 3 is increased so as to reduce the difference between the air-fuel ratio of the mixture and the stoichiometric air-fuel ratio. As a result of this, the time period during which the comparator 43 produces an output voltage of a high level, becomes approximately equal to the time period during which the comparator 43 produces an output voltage of a low level and, as a result, the total air-fuel ratio is controlled so as to be equalized with the stoichiometric air-fuel ratio by feeding a small amount of secondary air into the exhaust passage, as in the case wherein the vehicle is driven at a low altitude. At this time, the mean value $V_m$ of the output voltage of the adder circuit 48 is maintained at a constant level which is slightly larger than the mean value $V_f$ if the output voltage of the adder circuit 48 in the case wherein the vehicle is driven at a low altitude. In the case wherein the vehicle is driven at an even higher altitude, since the mean value $V_m$ of the output voltage of the adder circuit 45, that is, the output voltage $V_p$ of the differential amplifier 52 is further increased, the width of the pulse fed into the solenoids 32, 41 is increased and, as a result, the amount of air fed into the main fuel passage 24 and the slow fuel passage 33 is increased.

Figure 4:
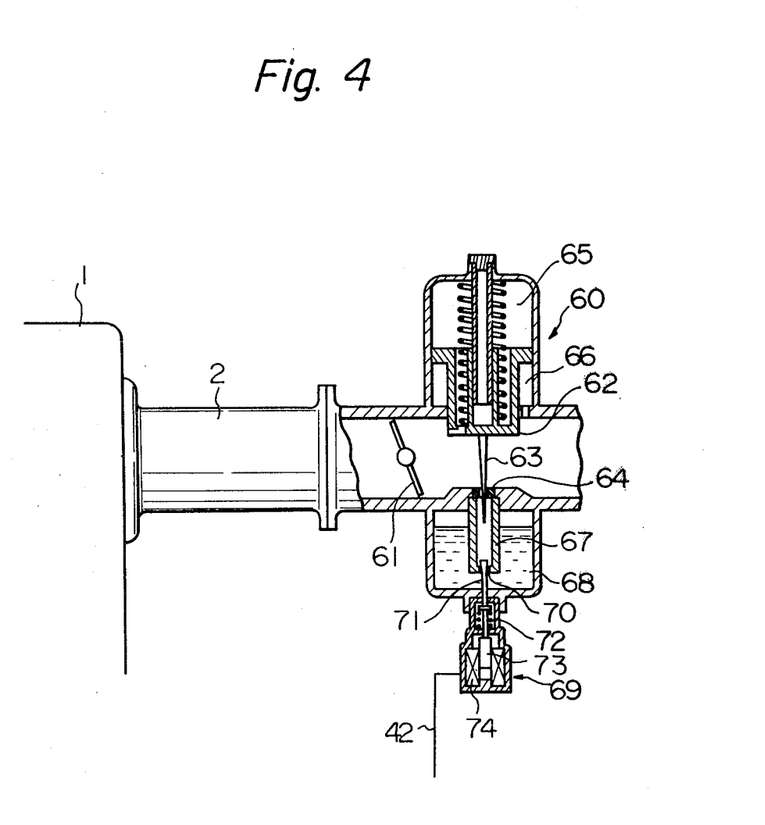
FIG. 4 is a cross-sectional side view of an alternative embodiment according to the present invention.

FIG. 4 illustrates an alternative embodiment, according to the present invention. In this embodiment, the intake manifold 2 is equipped with a variable venturi type carburetor 60. This variable venturi type carburetor 60 comprises a throttle valve 61, a suction piston 62, a movable needle 63 fixed onto the bottom face of the suction piston 62, a metering jet 64 cooperating with the movable needle 63, a vacuum chamber 65, and an atmospheric pressure chamber 66. The suction piston 62 moves up and down so that the vacuum produced in the mixture passage between the suction piston 62 and the throttle valve 61 is always maintained at a constant level. The metering jet 64 is connected to a float chamber 68 via a fuel feed pipe 67, and an air-fuel ratio control device 69 is arranged below the fuel feed pipe 67. The air-fuel ratio control device 69 comprises a fuel control valve 71 for controlling the flow area of a valve port 70 formed in the lower end of the fuel feed pipe 67, a compression spring 72 for always biasing the fuel control valve 71 towards the valve port 70, a movable plunger 73 connected to the fuel control valve 71, and a solenoid 74 for attracting the movable plunger 73. The solenoid 74 is connected to the output terminal of the amplifier 56 (FIG. 2). In this embodiment, in the case wherein the vehicle is driven at a high altitude, the solenoid 74 is energized. As a result of this, since the flow area of the valve port 70 is reduced, the amount of the fuel fed from the metering jet 64 is reduced.

According to the present invention, when a vehicle is driven at a high altitude, it is possible to equalize the overall air-fuel ratio with the stoichiometric air-fuel ratio by feeding a small amount of the secondary air into the exhaust passage of the engine, as in the case wherein the same vehicle is driven at a low altitude. Consequently, since it is not necessary to increase the volume of the air pump, it is possible to reduce the manufacturing cost of the engine. In addition, when the vehicle is driven at a high altitude, since the amount of the secondary air fed into the exhaust passage is small, it is possible to prevent the three way catalyzer from being deteriorated and also to prevent the three way catalytic converter from being damaged. Consequently, even if the vehicle is used at a high altitude, it is possible to ensure a satisfactorily long life of the three way catalyzer and the three way catalytic converter.

While the invention has been described by reference to specific embodiments chosen for purposes of illustration, it should be apparent that numerous modifications could be made thereto by those skilled in the art without departing from the spirit and scope of the invention.

I claim:

1. An altitude compensating device of an internal combustion engine comprising an intake passage, a fuel feed apparatus arranged in said intake passage, an exhaust passage, and an air pump driven by said engine and connected to said exhaust passage via a secondary air feed passage, said device comprising:

a detector arranged in said exhaust passage for detecting the overall air-fuel ratio to produce a detecting signal;

a first comparator for comparing said detecting signal with a first reference voltage to produce an output signal, the potential of which is a high level when the total air-fuel ratio is less than the stoichiometric air-fuel ratio, but is a low level when the total air-fuel ratio is greater than the stoichiometric air-fuel ratio;

a first integrator for integrating the output signal of said first comparator;

an adder for adding an output signal of said first integrator to the output signal of said first comparator;

first means for generating a first train of pulses, each having a width which is proportional to the level of the output signal of said adder;

secondary air feed control means arranged in said secondary air feed passage and actuated in response to said first train of pulses for increasing the amount of the secondary air fed into said exhaust passage from said air pump in accordance with an increase in the width of the pulse of said first train of pulses;

a second integrator for integrating the output signal of said adder to produce an output signal having a level which corresponds to the mean value of the output signal of said adder and is increased in accordance with an increase in altitude, the time constant of said second integrator being greater than that of said first integrator;

second means for generating a second train of pulses, each having a width which is proportional to the level of the output signal of said second integrator, and;

air-fuel ratio control means arranged in said fuel feed apparatus and actuated in response to said second train of pulses for increasing the air-fuel ratio of a mixture formed by said fuel feed apparatus to reduce the difference between the air-fuel ratio of said mixture and the stoichiometric air-fuel ratio when the altitude is higher than a predetermined level.

2. An altitude compensating device as claimed in claim 1, wherein said first means comprises a generator for generating a saw tooth shaped wave, and a comparator for comparing said saw tooth shaped wave with the output signal of said adder to produce said first train of pulses.

3. An altitude compensating device as claimed in claim 1, wherein said second means comprises a generator for generating a saw tooth shaped wave, and a comparator for comparing said saw tooth shaped wave with the output signal of said second integrator to produce said second train of pulses.

4. An altitude compensating device as claimed in claim 2 or 3, wherein said saw shaped wave has a fixed frequency ranging from 20 Hz to 40 Hz.

5. An altitude compensating device as claimed in claim 1, wherein said second integrator has the time constant which is sufficient to make smooth the output signal of said adder.

6. An altitude compensating device as claimed in claim 1, wherein, said device further comprises a differential amplifier connected between said second integrator and said second means for amplifying the potential difference between the output signal of said second integrator and a second reference voltage.

7. An altitude compensating device as claimed in claim 6, wherein said second reference voltage is slightly larger than the level of the output signal of said second integrator when ambient pressure is approximately equal to the normal atmospheric pressure.

8. An altitude compensating device as claim in claim 1, wherein said secondary air feed control means comprises a valve for controlling the flow area of said secondary air feed passage, and a solenoid for actuating said valve in response to said first train of pulses.

9. An altitude compensating device as claimed in claim 1, wherein said fuel feed apparatus comprises a main nozzle, a main fuel passage connected to said main nozzle, and a first air bleed port arranged in said main fuel passage for bleeding air into said main fuel passage, said air-fuel ratio control means comprising a first valve for controlling the flow area of said first air bleed port, and a solenoid for actuating said first valve in response to said second train of pulses to increase the amount of air bled into said main fuel passage in accordance with an increase in the width of the pulse of said second train of pulses.

10. An altitude compensating device as claimed in claim 9, wherein said fuel feed apparatus further comprises a slow fuel feed port, a slow fuel passage connected to said slow fuel feed port, and a second air bleed port arranged in said slow fuel passage for bleeding air into said slow fuel passage, said air-fuel ratio control means further comprising a second valve for controlling the flow area of said second air bleed port, and a solenoid for actuating said second valve in response to said second train of pulses to increase the amount of air bled into said slow fuel passage in accordance with an increase in the width of the pulse of said second train of pulses.

* * * * *